UNITED STATES PATENT OFFICE.

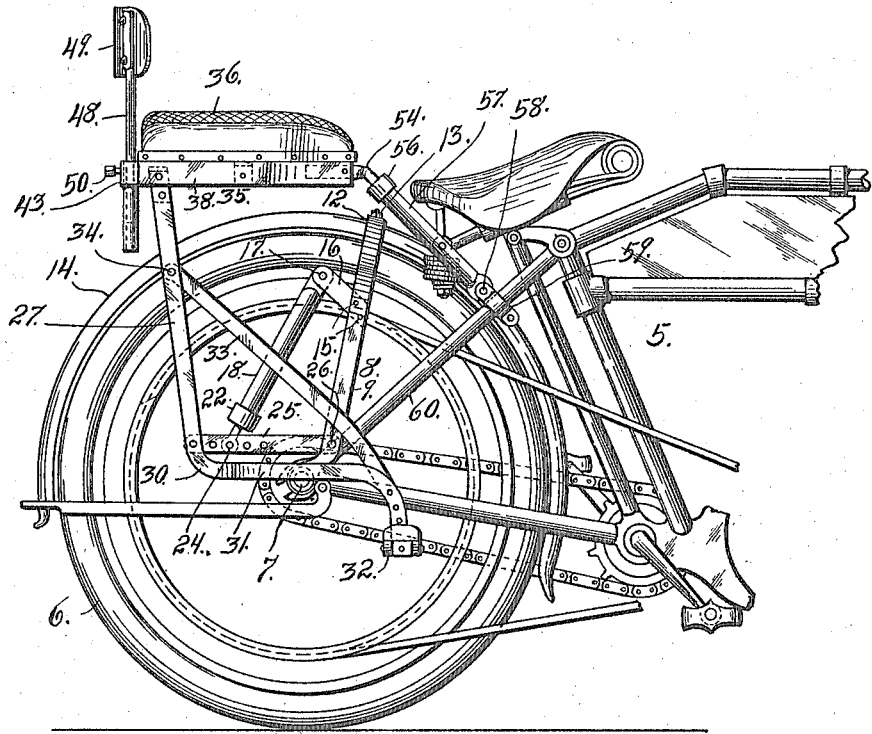
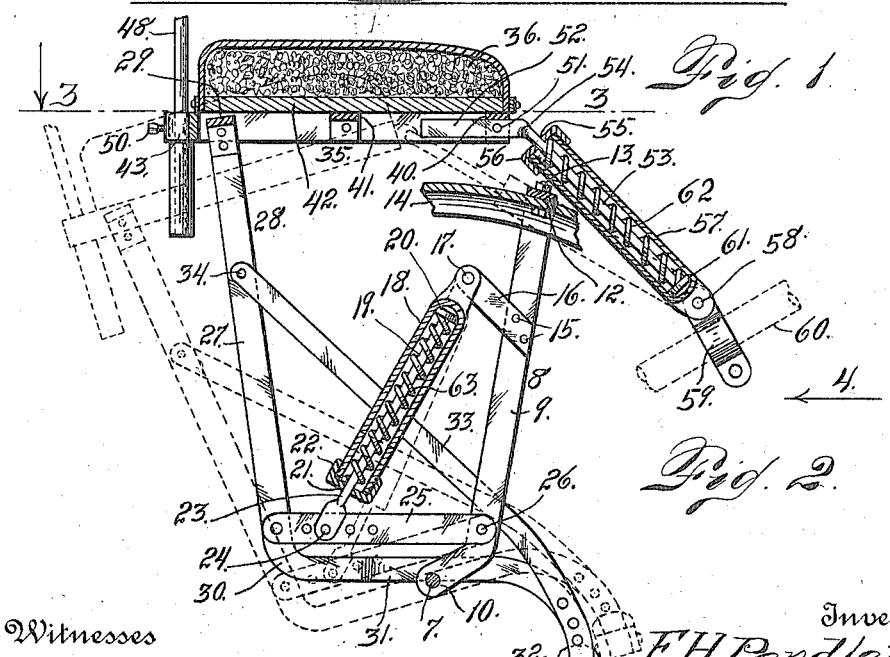

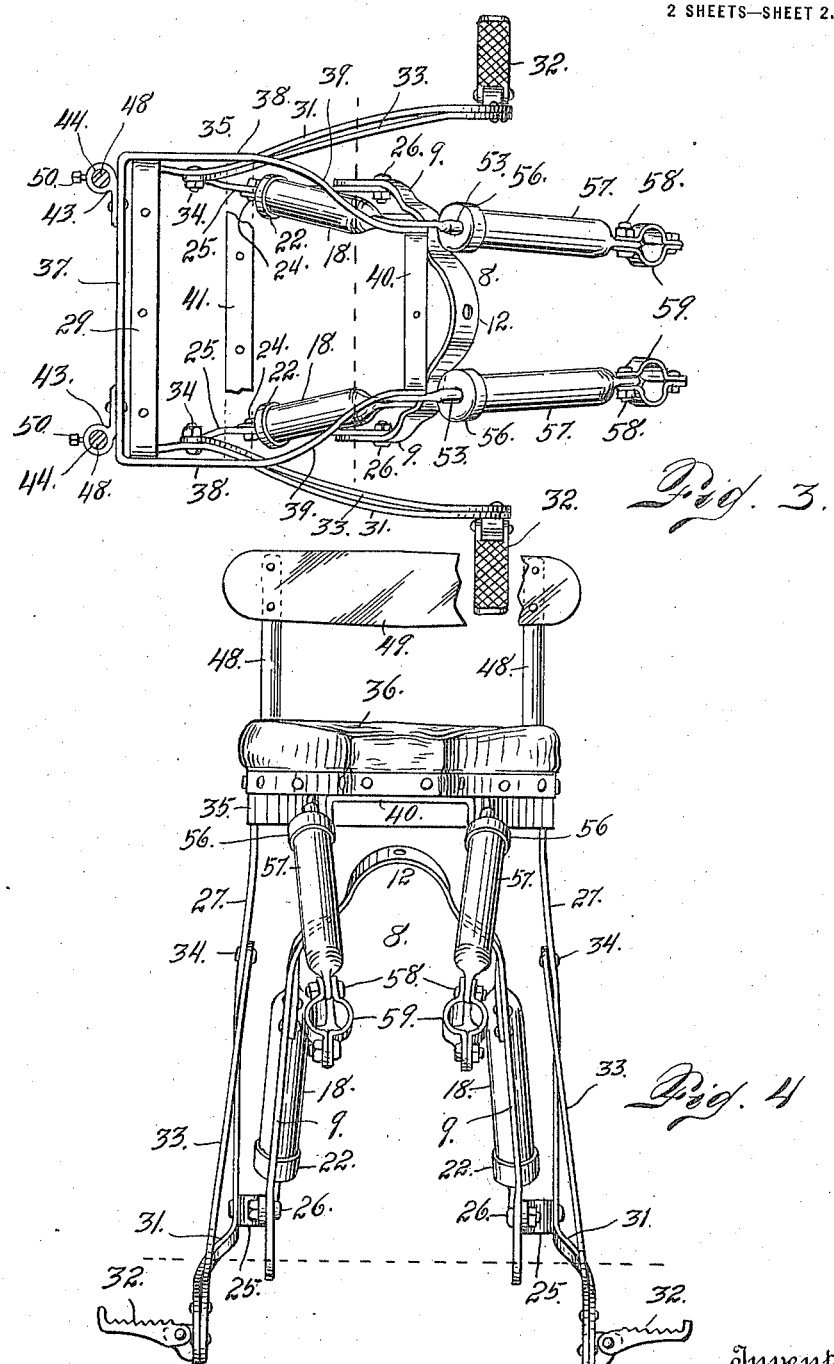

FRANK H. PENDLETON, OF DENVER, COLORADO, ASSIGNOR OF ONE-HALF TO JOHN B. FULLER, OF DENVER, COLORADO, AND ONE-HALF TO ELMER I. GARNER, OF GRAND ISLAND, NEBRASKA.

SPRING-SEAT FOR MOTOR-CYCLES.

1,181,796.  Specification of Letters Patent.  Patented May 2, 1916.

Application filed June 7, 1915. Serial No. 32,582.

*To all whom it may concern:*

Be it known that I, FRANK H. PENDLETON, a citizen of the United States, residing in the city and county of Denver and State of Colorado, have invented certain new and useful Improvements in Spring-Seats for Motor-Cycles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring seats, more especially intended for use on motorcycles, and which may be employed in other relations or wherever a seat of this character is required.

As illustrated in the drawing my improvement is applied to a motorcycle and is arranged in the rear of the regular seat of the machine. In other words the spring seat of my invention, as illustrated in the drawing is adapted for use when the person in charge of the motorcycle is carrying a passenger so to speak, and its construction is such that it will yield sufficiently to relieve the person occupying the seat from undue jar, resulting from the vibrations of the machine over ordinary roads. It is well known that machines of this character are usually run very rapidly, and in the absence of some provision for relieving the riders from jar or concussion resulting from passing over unevennesses in the track, traveling by these machines is not very pleasant. Hence the object of my improvement is to overcome this difficulty so far as relates to the occupant of the rear or passenger seat.

Having briefly outlined my improved construction as well as the function it is intended to perform I will proceed to describe the same in detail, reference being made to the accompanying drawing, in which is illustrated an embodiment thereof.

In this drawing,—Figure 1 is a side elevation of the rear portion of a motorcycle, equipped with my improved spring seat. Fig. 2 is a section taken through the seat which is shown in two positions, one in full lines and the other in dotted lines. Fig. 3 is a section taken on the line 3—3 Fig. 2 looking downwardly. Fig. 4 is a front view of the spring seat which is shown in detail, being a view looking in the direction of the arrow 4 Fig. 2.

The same reference characters indicate the same parts in all the views.

Let the numeral 5 designate the frame work of a motorcycle; 6 the rear wheel and 7 the rear axle of the machine. Mounted on the rear axle is a stationary arch 8 whose depending side arms 9 are connected with the axle of the machine as shown at 10, the extremities of these arms being perforated for the purpose. The top 12 of the arch is secured as shown at 13 to the upper portion of the mud guard or shield 14. To the side arms 9 of this arch are rigidly secured as shown at 15, two rearwardly projecting parts 16. These projections 16 are relatively short and to their rear extremities are pivotally connected tubular casings 18 which are inclined rearwardly as they extend downwardly from the said projections. Projecting into each of these casings 18, is a rod 19 whose upper extremity is equipped with a disk 20 which is approximately of the same diameter as the interior of the casing. The rod 19 passes through an opening 21 formed in a screw cap 22 which closes the lower extremity of the casing. Below the casing, the protruding portion 23 of this rod is pivotally connected as shown at 24 with a link 25 one extremity of which is pivotally connected with the lower part of an arm 9 of the arch, as shown at 26, while its opposite extremity is connected with one of the side members 27 of a framework 28 of the spring seat. This framework is composed of a top member 29 and two depending approximately parallel parts 27 which are bent as shown at 30 just below where the rear extremities of the links 25 are attached. The parts 27 of the frame member 28, have parts 31 extending forwardly from the bends 30, the forward extremities of these parts 31 being equipped with supports 32 for the feet of the person occupying the spring seat. Connected with the forward extremities of these parts 31, are the lower and forward extremities of braces 33 whose upper extremities are secured as shown at 34 to the upper portions of the parts 27 of the frame member 28.

To the top part 29 of the frame member 28, is secured a supporting frame 35 for the seat proper 36. This frame 35 is approximately horizontally disposed and consists of a rear part 37 and side parts 38 extending forwardly from the opposite extremities of the part 37. The rear portions of the parts 38 form right angles approximately with the part 37, while the forward portions of the parts 38 are curved inwardly as shown at 39, their forward extremities being connected by a transverse part 40. The two parts 38 are further connected intermediate their extremities by a transverse part 41. The seat proper 36 is provided with a base or bottom member 42 which is directly secured to the supporting frame 35 by means of fastening devices of any suitable character.

The rear part 37 of the seat supporting frame is provided with brackets 43 having eyes 44 adapted to receive rods 48 whose upper extremities are secured to curved transversely arranged member 49, adapted to engage and support the back of the person occupying the spring seat. The rods 48 are normally slidable in the eyes 44, but are secured in the desired position of adjustment by means of set-bolts 50.

To the forward extremities of the side parts of the seat supporting frame 38, are secured as shown at 51, the rear parts 52 of two rods 53 which are bent downwardly as shown at 54, at the forward extremities of the parts 52, forming with the last named parts angles of approximately 45 degrees. These rods pass through perforations 55 formed in screw caps 56 of tubular casings 57 whose forward and lower extremities are pivotally connected as shown at 58 with clasps 59 which are rigidly secured to a frame member 60 of the machine. The lower and forward extremity of each rod 53 is equipped with a disk 61 which forms a stop for the lower extremity of a spiral spring 62 whose upper extremity bears against the screw cap 56.

The rods 19 which enter the casings 18 as heretofore explained, are surrounded by spiral springs 63 whose upper extremities bear against the stop disks 20, and whose lower extremities engage the screw caps 22.

From the foregoing description, taken in connection with Fig. 2 of the drawing, the operation of my improved spring seat will be readily understood. When the machine is in use, and when the necessities of the case so require, the seat and its various parts will move from the full line position, to the dotted line position in Fig. 2. In other words the seat proper under the stress due to the operation of the machine over ordinary roads will have a tendency to move rearwardly and downwardly, or to change its position from that shown in full lines to that shown in dotted lines in Fig. 2. During such movement, the rods 19 and 53 will move out of their casings, whereby their stop disks 20 and 61, will compress the springs 63 and 62 respectively, which springs will thereby be placed under tension or stress, and whose tendency will be to return the seat proper and its movable parts to their normal position. Hence by virtue of this construction my improved seat possesses the necessary or desirable range of yielding movement, in order to prevent the occupant thereof from being subjected to the ordinary, disagreeable experience resulting from riding on machines of this character, where no provision is made for relieving the concussion or jars incident to motorcycle travel.

Having thus described my invention, what I claim is,—

1. A spring seat for motorcycles comprising in combination with the stationary framework of the machine, an arch-shaped member rigidly secured to the framework of the machine, a seat supporting frame member whose lower portion is pivotally connected with the arch-shaped member, and a yielding connection between the lower portion of the seat supporting member and the arch-shaped member, and a similar connection between the upper part of the seat supporting member and the stationary framework of the machine.

2. An auxiliary seat for motorcycles comprising a frame for supporting the seat proper, a pivotal connection between the lower part of said frame and the framework of the machine, and yielding connections respectively, between the upper and lower portions of the seat supporting frame and the stationary framework of the machine.

3. In an apparatus of the class described, the combination with the stationary framework of the machine including an arch-shaped member connected on opposite sides with the axle and extending upwardly therefrom over the rear wheel, of a seat supporting frame whose lower portion is pivotally and yieldingly connected with the said arch-shaped member, and a yielding connection between the upper portion of said seat supporting frame and the framework of the machine.

4. A spring seat for motorcycles comprising in combination with the stationary framework of the machine, a frame for supporting the seat proper, a pivotal connection between the lower part of said frame and the framework of the machine, and yielding connections between the upper and lower parts respectively, of the seat supporting frame and the stationary framework of the machine, said connections comprising casings pivotally connected with the framework, and spring-held rods movable in said casings and protruding therefrom, their protruding extremities being pivotally connected with the seat supporting frame.

5. A spring seat for motorcycles comprising in combination with the framework of the machine, a frame for supporting the seat proper, a pivotal connection between the lower part of said frame and the framework of the machine, and yielding connections between the upper and lower parts respectively, of the seat supporting frame and the framework of the machine, said connections comprising casings pivotally connected with the framework, and spring-held rods movable in said casings and protruding therefrom, their protruding extremities being pivotally connected with the seat supporting frame, the axes of one set of casings forming angles with the axes of the other set of casings.

6. A spring seat for motorcycles comprising in combination with the framework of the machine, a frame for supporting the seat proper, a pivotal connection between the lower part of said frame and the framework of the machine, and yielding connections between the upper and lower portions respectively, of the seat supporting frame and the stationary framework of the machine, said connections being pivoted at their opposite extremities to the connected parts.

7. A spring seat for motorcycles comprising in combination with the framework of the machine, a rear upright seat supporting frame member and a top seat-supporting member the two members being rigidly secured together, the rear member having its lower portion pivotally connected with the stationary framework of the machine, a yielding connection between the said top member and the stationary framework, and a similar connection between the lower part of the said rear member and the said last named framework.

In testimony whereof I affix my signature in presence of two witnesses.

FRANK H. PENDLETON.

Witnesses:
 BESS MITCHELL,
 A. J. O'BRIEN.

Copies of this patent may be obtained for five cents each, by addressing the "Commissioner of Patents, Washington, D. C."